United States Patent
Liu et al.

(10) Patent No.: US 9,335,410 B2
(45) Date of Patent: *May 10, 2016

(54) SYSTEM AND METHOD FOR MULTIPLE SPOTLIGHT SYNTHETIC RADAR IMAGING USING RANDOM BEAM STEERING

(71) Applicant: Mitsubishi Electric Research Laboratories, Inc., Cambridge, MA (US)

(72) Inventors: Dehong Liu, Lexington, MA (US); Petros Boufounos, Boston, MA (US)

(73) Assignee: MITSUBISHI ELECTRIC RESEARCH LABORATORIES, INC., Cambridge, MA (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/770,096

(22) Filed: Feb. 19, 2013

(65) Prior Publication Data

US 2014/0232591 A1 Aug. 21, 2014

(51) Int. Cl.
*G01S 13/89* (2006.01)
*G01S 13/90* (2006.01)

(52) U.S. Cl.
CPC ..... *G01S 13/9035* (2013.01); *G01S 2013/9052* (2013.01)

(58) Field of Classification Search
CPC ............. G01S 13/9035; G01S 13/90; G01S 2013/9052
USPC ............................................. 342/25 R–25 F
See application file for complete search history.

(56) References Cited

U.S. PATENT DOCUMENTS

| 7,511,656 | B2 | 3/2009 | Callison | |
|---|---|---|---|---|
| 7,973,703 | B2 | 7/2011 | Burri | |
| 2010/0001901 | A1* | 1/2010 | Baraniuk | G01S 7/295 342/25 F |
| 2010/0141508 | A1* | 6/2010 | Nguyen | G01S 13/90 342/25 F |
| 2011/0175770 | A1* | 7/2011 | Boufounos | G06K 9/0063 342/25 A |
| 2012/0105276 | A1* | 5/2012 | Ryland | G01S 13/9035 342/25 F |
| 2012/0146846 | A1 | 6/2012 | Antonik et al. | |
| 2012/0206292 | A1 | 8/2012 | Boufounos et al. | |
| 2014/0077989 | A1* | 3/2014 | Healy, Jr. | G01S 13/9035 342/25 F |
| 2014/0232590 | A1* | 8/2014 | Jin | G01S 13/5242 342/25 F |
| 2014/0266869 | A1* | 9/2014 | Liu | G01S 13/9035 342/25 F |
| 2015/0061926 | A1* | 3/2015 | Ranney | G01S 13/9029 342/25 B |

FOREIGN PATENT DOCUMENTS

WO  2008063691 A2  5/2008

OTHER PUBLICATIONS

Baraniuk et al.: "Compressive Radar Imaging." Radar Conference, 2007 IEEE, PI, Apr. 1, 2007. p. 128-133, XPO31180891.

* cited by examiner

*Primary Examiner* — John B Sotomayor
*Assistant Examiner* — Marcus Windrich
(74) *Attorney, Agent, or Firm* — Gene Vinokur; James McAleenan; Hironori Tsukamoto

(57) ABSTRACT

A spotlight synthetic aperture radar (SAR) image is generated by directing randomly a beam of transmitted pulses at a set of two or more areas using a steerable array of antennas. Each area is illuminated by an approximately equal number of the transmitted pulses. Then, a reconstruction procedure is applied independently to received signals from each area due to reflecting the transmitted pulses to generate the image corresponding to the set of areas.

5 Claims, 4 Drawing Sheets

SYSTEM AND METHOD FOR MULTIPLE SPOTLIGHT SYNTHETIC RADAR IMAGING USING RANDOM BEAM STEERING

FIELD OF THE INVENTION

This invention relates generally synthetic aperture radar (SAR) imaging, and particularly to spotlight SAR.

BACKGROUND OF THE INVENTION

Spotlight SAR

Synthetic aperture radar (SAR) uses moving sensors to form a large synthetic aperture that improves a resolution of an acquired image. In spotlight mode, the pulses emitted by the sensors are steered as a beam to always illuminate a single relatively small area (spot) of interest using pulses transmitted at uniform time intervals. Received signals are used to produce a significantly higher imaging resolution compared to physical aperture arrays, or strip-map mode synthetic arrays. The received signals are also known as echoes or reflections. The received signals that are measured have a complex waveform when compared with the pulses.

However, there is a tradeoff between imaging resolution and coverage. Compared to strip-map mode SAR, conventional spotlight mode cover a much smaller area because of its high sampling rate requirement and restrictions on its beam geometry. This is contrasted with strip-mode SAR where the beam is not steered.

Compressive Sensing

Compressive sensing (CS) is frequently used in sensing applications, including radar imaging. CS enables signal acquisition and accurate reconstruction using a significantly smaller number of measurements compared to the Nyquist rate. The rate reduction is due to randomized measurements, improved signal models, and non-linear reconstruction procedures.

Although CS significantly improves radar and radar imaging systems, a number of challenges still exist in applying CS to radar imaging, such as developing appropriate sparsity models of radar images, and managing computational complexity.

FIG. 1 generally shows conventional spotlight SAR imaging using a linear mono-static array. To image a scene 101, an array of sensors moves along a path 102. Pulses are transmitted at a uniform pulsing rate. Received signals are used to image the reflectivity of the scene.

In spotlight mode, the beam of pulses is steered such that the main lobe of the pulse beam is directed at the center 103 of the area. Each reflection from the area is effectively a convolution of the pulse with the reflectivity of the area covered by the pulse. Thus, the data acquisition process can be modeled as a linear system $$y = \Phi x + n, \quad (1)$$

where y denotes the received signals, x denotes the reflectivity of the scene, $\Phi$ models an array acquisition function of the array parameters, and n is noise.

The goal of the image formation process is to determine the reflectivity x from the received signals y given the acquisition function $\Phi$. In other words, an inverse problem is solved. If the acquisition function $\Phi$ is invertible, then an obvious choice would be to use the inverse or the pseudoinverse $^\dagger$ of $\Phi$ to determine x as $$\hat{x} = \Phi^\dagger y. \quad (2)$$

However in practical SAR systems, the acquisition function $\Phi$ is generally difficult to model accurately, and the inversion can be computationally complex. Typically, array image formation is achieved using well known procedures, such as a chirp-scaling procedure, or a wave-number procedure, which approximates the inversion.

U.S. Pat. No. 7,973,703 describes an SAR system operating in stripmap mode that reduces the number of pulses by randomly removing some of the pulses to form an image. The reduction introduces blur describes in terms of sidelobes of a main beam.

SUMMARY OF THE INVENTION

With a conventional spotlight mode synthetic imaging, array as described above, pulses emitted by moving sensors are steered as a beam to illuminate one area with uniform timing pulses to acquire a high resolution image.

The embodiments of the invention provide a method and system for a steerable synthetic imaging array, in which the beam is randomly steered such that each pulses randomly illuminate a set of at least two areas of a scene to be imaged, with each area being of identical in size as the coverage of the conventional synthetic imaging array.

Then, compressive sensing can be used to reconstruct images of both areas by imposing sparsity of reconstructed images, yielding image of identical resolution and doubled coverage compared to the conventional spotlight synthetic imaging array.

DETAILED DESCRIPTION OF THE PREFERRED EMBODIMENTS

Randomly Steerable Spotlight Array

Figure 2:
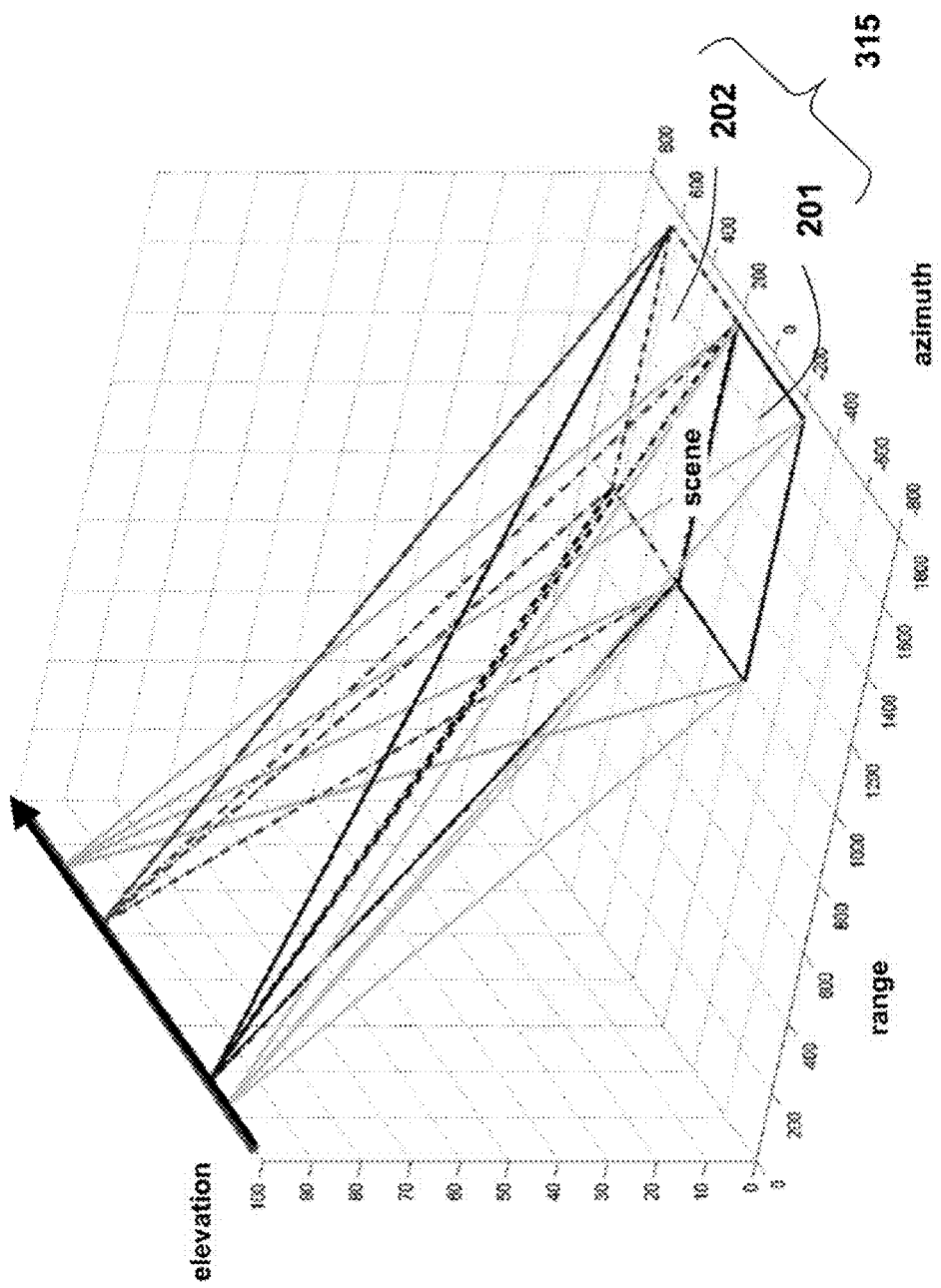
FIG. 2 is a schematic of a spotlight SAR system according to embodiments of the invention.

As shown in an example in FIG. 2, the embodiments of the invention provide a method and system for a random steerable spotlight synthetic aperture radar (SAR) system. Our randomly steerable array also uniformly transmits pulses and receives signals, also known as echoes or reflections having a complex waveform when compared to the pulses. Our array increases the flexibility of the beam steering.

Figure 1:
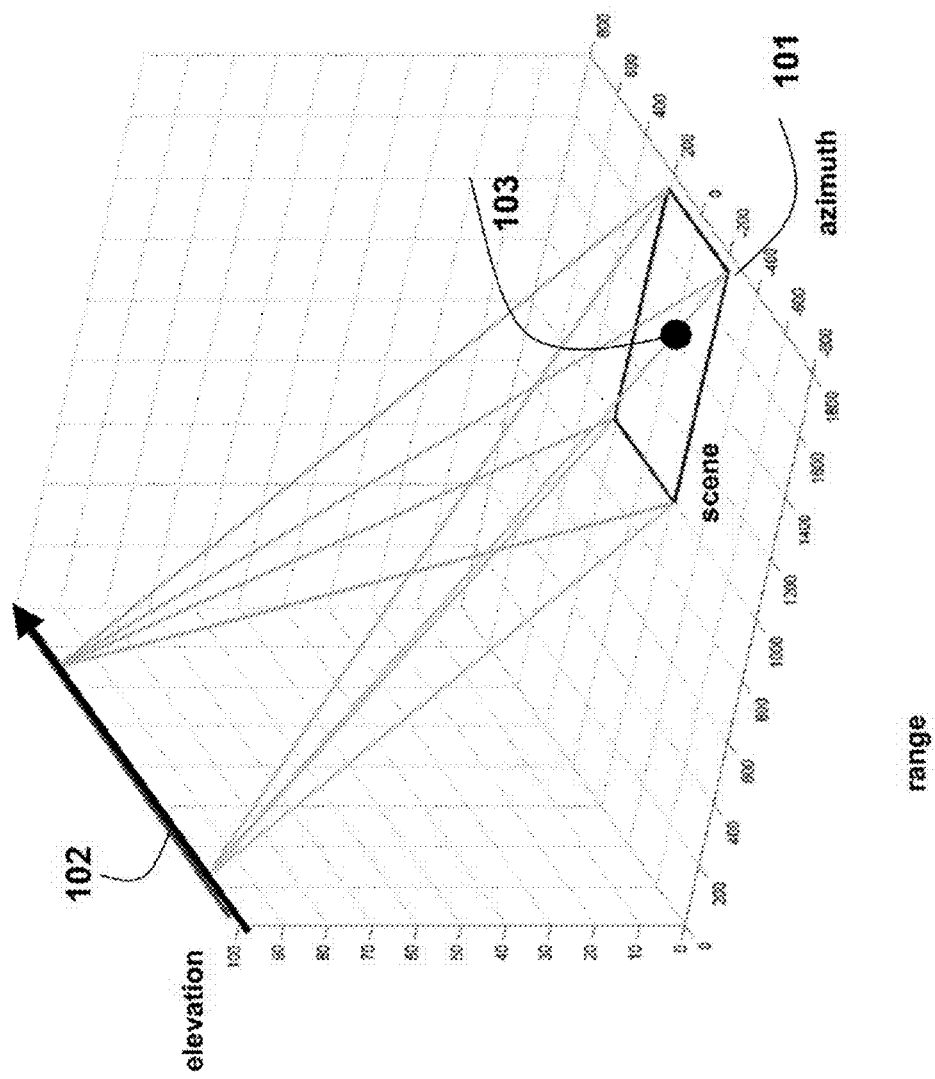
FIG. 1 is a schematic of a conventional synthetic aperture radar (SAR system operating in spotlight mode.

As shown in an example in FIG. 2, instead of steering the beam of pulses always at the same area, we illuminate a set of at least two areas 201-202 in a scene 315. Each area has about the same size as the single area in the conventional system shown in FIG. 1. The example shows that illuminating two areas results in illuminating an area of doubled size. As used herein the set includes at least two areas. The location and shape of the areas is arbitrary, depending, for example, on a structure of the antenna. Here for simplicity, we use rectangular adjacent areas.

At different transmitting or receiving locations, we randomly select one of the areas to illuminate with equal probability. In the example, each of the two areas is about the same size as the conventional array coverage, but is illuminated by only half the pulses, using the other half for the other area. Additional areas can be accommodated.

For each of the areas, the randomly steerable SAR system can modeled as conventional spotlight-mode SAR, except that some of the data are missing because some pulses are directed at the other area(s). Thus, we describe the data acquisition process as a linear operation with missing data.

Spotlight SAR System

Figure 3:
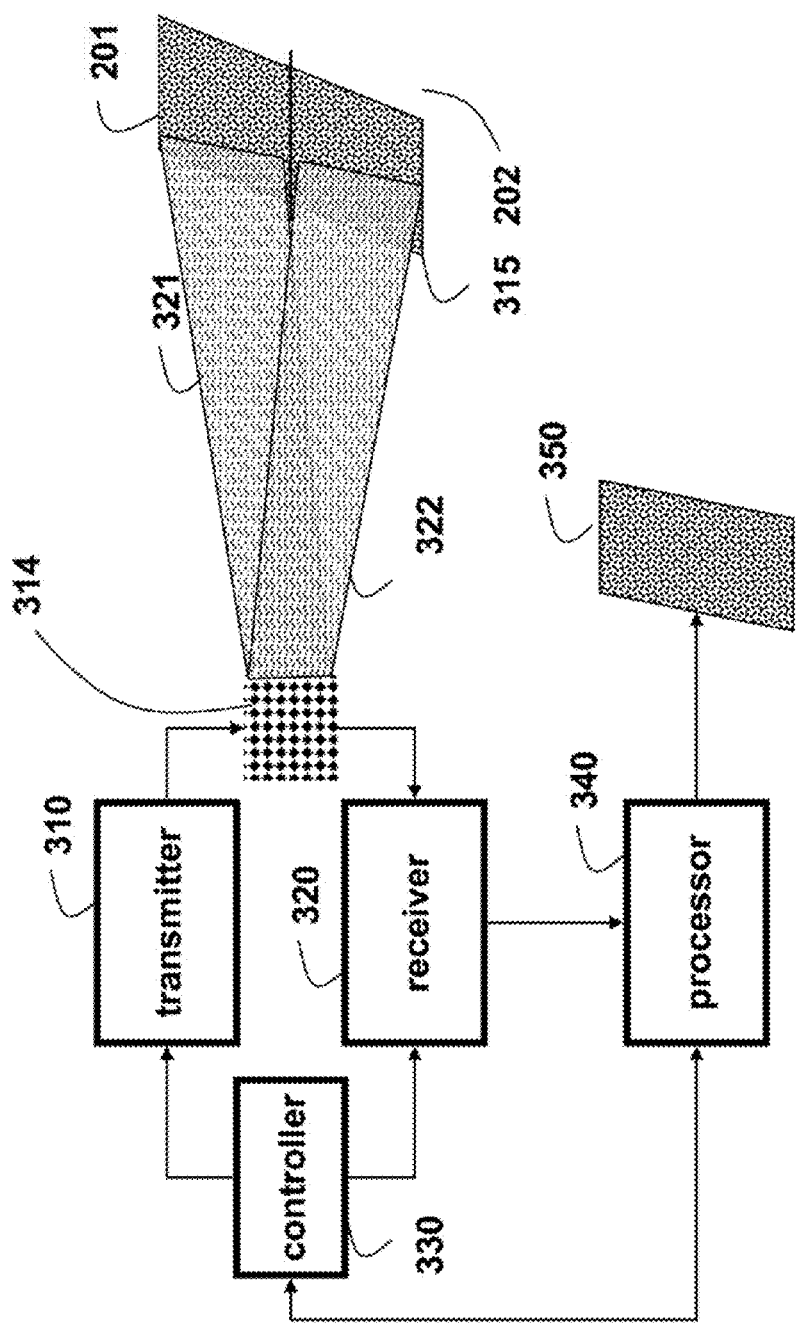
FIG. 3 is a block diagram of a spotlight SAR system according to embodiments of the invention.

FIG. 3 shows a spotlight SAR system. The system includes a transmitter 310 and a receiver connected to a controller 330 and steerable antenna array 314. The controller determines the synchronization and steering of the pulses and received signals. As describe above, the scene includes multiple areas, and the pulses are transmitted to the areas randomly and uniformly in a spatial dimension.

Figure 4:
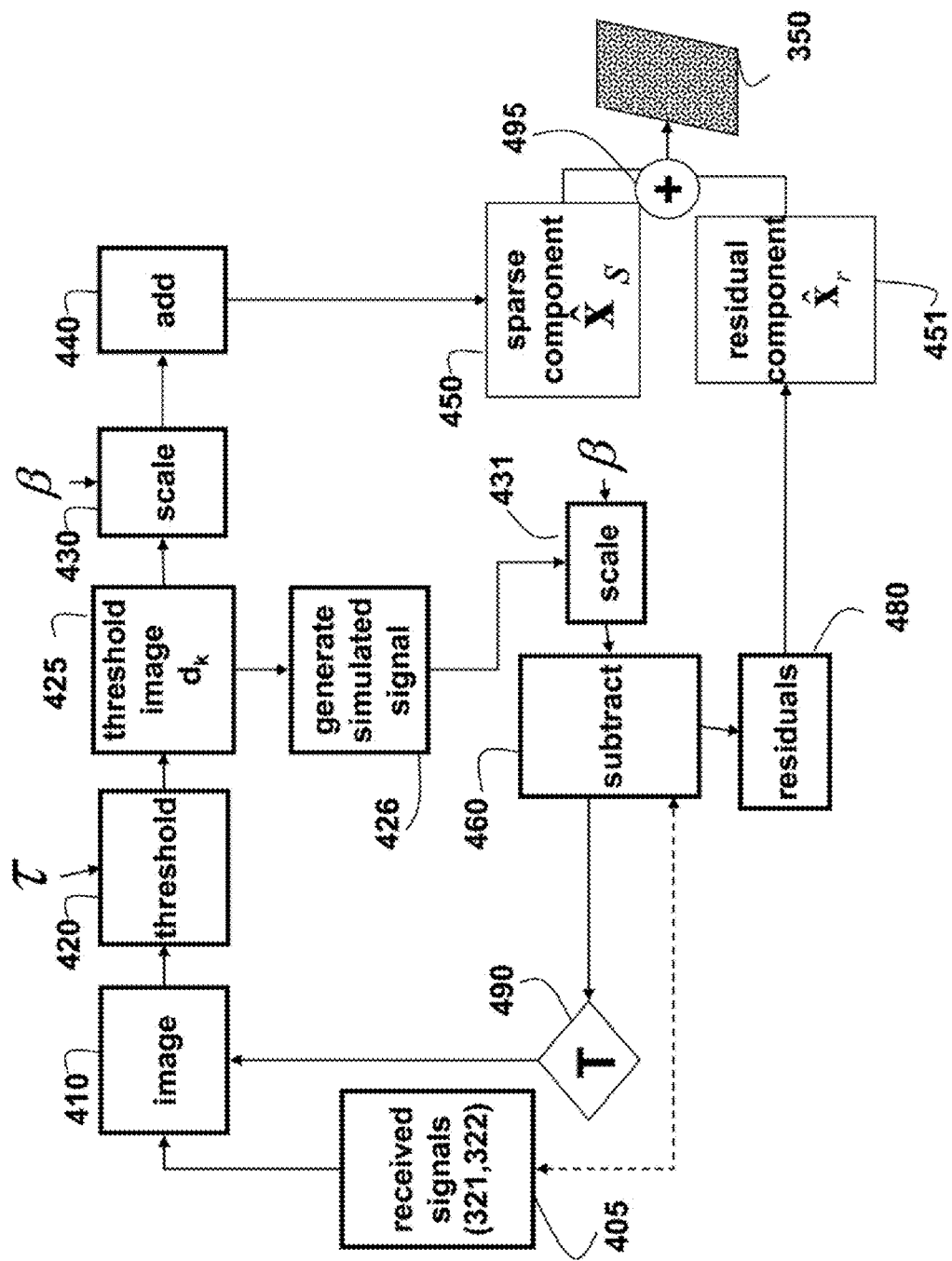
FIG. 4 is a block diagram of a method for spotlight SAR imaging according to embodiments of the invention.

For clarity, only the received signals 321 tbr area 201 and the received signals 322 for area 202 are shown. The received signals are processed by processor 340 to produce a radar image 350 corresponding to the reflectivity of the scene 315. The processor executes a reconstruction method shown in FIG. 4.

Reconstruction Method

Initialization set $0<\alpha<1$, $\hat{x}_s^{(0)}=0$, $y_{mr}^{(0)}=y_m$, where $\alpha$ is a threshold value, $\hat{x}_s^{(0)}$ is an initial sparse component of the radar image to be reconstructed, and $y^{(0)}_{mr}$ are initial measured and residual signals. The method iterates until a termination condition 490 is reached, e.g., K iterations or convergence, whichever comes first.

The output is a combination 495 of selected measured and sparse signals $y_{mr}$ sufficient to generate the radar image 350 using an acquisition function $\Phi$ and it selection operator E.

After initialization, the received signals 405, i.e., signals 321 and 322, are imaged 410 to produce an approximate (~) image according to $$\tilde{x}^{(k)}=\Phi^\dagger E^\dagger y_{mr}^{(k-1)}.$$

The imaging can use conventional radar imaging techniques as known in the art.

The approximate image is thresholded 420

$$\tau^{(k)}=\max(|x^{(k)}|)\cdot\alpha,$$

to produce a threshold image 425

$$d^{(k)}=\mathcal{H}_{\tau}(x^{(k)}),$$

where d is a maximal value returned by the function max. thus, in the above equation the thresholded image is produced with threshold $\tau^{(k)}$ on $x^{(k)}$.

From the threshold image, simulated signal are generated 426 and sealed 431 according to $$\tilde{y}^{(k)}=E\Phi d^{(k)},$$

where a scaling factor is $$\beta = \frac{\langle \tilde{y}^{(k)}, y_{mr}^{(k-1)}\rangle}{\langle \tilde{y}^{(k)}, \tilde{y}^{(k)}\rangle}, \text{ and } y_{mr}^{(k)} = y_{mr}^{(k-1)} - \beta\tilde{y}^{(k)}.$$

Simulated and scaled signals are subtracted 460 from the received signals to produce residuals 480.

The procedure iterates beginning at the imaging 410 step with the termination 490 condition is reached, while subtracting 460 the residuals from the approximate image. When the above iterative process terminates, the residuals 480 are used to generate the residual component $x_r$, 451.

Then after termination, the sparse component 450 and residual component 451 are combined 495 according to $$\hat{x}=\hat{x}_s^K+\hat{x}_r.$$

to produce the final image 350, which reconstructs reflectivity of the scene 315.

Random SAR Beam Steering

If the array is always steered towards area i, the array acquires $x_i$ using the linear acquisition function $\Phi_i$. However, some of the received signals are deliberately missing because some of the pulses are steered to other area(s) in the set.

We denote this selection process by the selection operator $E_i$. The selection operator only selects the data actually received and measured. Further, we use the operator $\bar{E}_i$ to denote the complementary selection operator, i.e., the operator only selects the data that are not acquired, i.e., missing or unmeasured signals.

Using $y_{mi}$ and $y_{ui}$ to denote the measured and unmeasured data, respectively, we have $$y_{mi}=E\Phi_i x_i+n, \quad (3)$$

$$y_{ui}=\bar{E}\Phi_i x_i. \quad (4)$$

Note that the $E_i$ are complementary, i.e., the data measured from area i cannot be measured from area j, i.e., j≠i.

Our goal is to image all the areas in the set, even with missing data, without compromising the overall imaging resolution. That is the final image is a "dense" radar image, even though each area only reflects a fraction of the pulses. We do this by using compressive sensing (CS) based methods that exploit the structure of the scene, typically in the form of sparsity under some appropriate basis transformation, and randomness in the acquisition process to enable an accurate reconstruction.

The steering randomization ensures that the linear measurements are incoherent and fully acquire the scene. Thus, the measurements can be inverted using a non-linear reconstruction process, which uses a signal model to recover the acquired signal in the radar image 350.

CS Based Image Reconstruction

We apply a reconstructing procedure to each area independently using only the received signals measured for this area.

Using the notation above, all data, including measured and unmeasured signals, can be represented as $$y = \begin{bmatrix} y_m \\ y_u \end{bmatrix} = \begin{bmatrix} E \\ \bar{E} \end{bmatrix}\Phi x. \quad (5)$$

In conventional CS, the image x is modeled to be sparse. As defined in the field, sparse means most of received signal energies are zero or very small, and only a few received signals have non-zero or significant energies. However, this model is generally inaccurate for radar imaging. While strong components in some domain might exist in radar imaging, the residual signals always seems large and difficult to take into account.

Therefore, we assume the radar image of reflectivity in the scene has a sparse component $x_s$ and a residual component $x_r$, such that $$x=x_s+x_r. \quad (6)$$

Substituting equation (6) into equation (5), the received signals 311 and 321 are $$y_m=E\Phi x_s+E\Phi x_r. \quad (7)$$

Treating $E\Phi x_r$ as noise, an estimate ($\hat{\ }$) of the sparse component $x_s$ is $$\hat{x}_s = \underset{x}{\operatorname{argmin}} \|y_m - E\Phi x\|_2^2 \quad \text{s.t.} \quad \|x\|_0 < N. \quad (8)$$

Given the sparse estimate $\hat{x}_s$, we can estimate its contribution, to the measured data $E\Phi\hat{x}_s$. Assuming the measured data $y_m - E\Phi\hat{x}_s$ due to the residual component $x_r$, we can obtain a least squares estimate using $$\hat{x}_r = (E\Phi)^\dagger (y_m - E\Phi\hat{x}_s). \quad (9)$$

Then, we can obtain the estimate of the final image 350 by combining 495 equations (8) and (9)

$$\hat{x} = \hat{x}_s + \hat{x}_r = \hat{x}_s + (E\Phi)^\dagger (y_m - E\Phi\hat{x}_s). \quad (10)$$

Note that the SIR image 350 is not sparse per se, but rather a combination of the sparse component, estimated using sparsity regularization, and the residual component estimated using the least-squares regularization. The least-squares regularization minimizes a sum of the squared residuals, a residual being a difference between a measured value and the fitted value according to some model.

Let $\hat{y}_s$ denote all the received signals corresponding to $\hat{x}_s$, i.e., $$\hat{x}_s = \Phi^\dagger \hat{y}_s, \quad (11)$$

where $\dagger$ indicate the pseudoinverse.

Then, we can rewrite equation (10) as $$\hat{x} = \Phi^\dagger \hat{y}_s + (E\Phi)^\dagger (y_m - E\Phi\hat{x}_s). \quad (12)$$

This solution is equivalent to filling in the missing data using the reconstruction by only enforcing, the sparsity model, and performing conventional least-squares imaging on the completed data. Note that E is the selection operator. i.e., $E^\dagger = E^T$, i.e. the pseudoinverse uses zeros for the missing data.

During each iteration, the procedure uses the residual 480 of $y_{mr}^{(k-1)}$ to determine an estimate of the so-far unexplained signal $\tilde{x}^{(k)}$.

To obtain the strongest received signals, a threshold image $\tau^{(k)}$ is determined 420 as a fraction of the largest in magnitude signal component. The estimate of the strongest received signals $d^{(k)}$ is determined by imposing a hard threshold $\mathcal{H}_\tau(\bullet)$ on $x^{(k)}$, i.e., by setting all signal less than $\tau^{(k)}$ in magnitude to zero.

This estimate is scaled using $\beta$ such that the estimate explains most of the residual energy in $y_{mr}^{(k-1)}$. Then, the estimate is added to the overall signal estimate from the previous iteration $\hat{x}_s^{(k-1)}$ to produce the current signal estimate $\hat{x}_s^{(k)}$, and subtracted 460 from the residual $y_{mr}^{(k-1)}$ to produce the updated residual $y_{mr}^{(k)}$. As the last step, after the iterations are concluded, the procedure uses the estimated signal $\hat{x}_s^{(K)}$ from the $K^{th}$ iteration to estimate the hill data $\hat{y}$ from which to estimate the final image $\hat{x}$ 350 using a conventional imaging procedure.

In summary, our method expresses the sparse component as a linear combination of a spatially sparse components of decreasing intensity in the measurements, corresponding to the most intense reflectors. To efficiently determine the imaging process $\Phi^\dagger$, we implement a wave number procedure, see U.S. Application 20120206292, "Synthetic Aperture Radar Image Formation System and Method," filed by Boufounos et al. on Aug. 16, 2012. The acquisition function $\Phi$ can also be determined with the same efficiency with minor modifications. To achieve relatively good imaging performance and fast execution, $\alpha > 0.5$.

In our method, we do not determine the pseudoinverse of a subset of $\Phi$. This is computationally complex because $\Phi$ is typically very large in imaging applications. Instead, similarly to the well known matching pursuit (MP), We use the signal value after thresholding, scaled by $\beta$, as an estimate of the sparse signal. This heuristic choice provides a good trade-off between speed and accuracy, compared to conventional CS procedures.

EFFECT OF THE INVENTION

The invention provides a randomly steerable synthetic aperture imaging system to increase the spotlight-mode SAR coverage without compromising the imaging resolution. Instead, of steering the spotlight to only illuminate one area, the spotlight is steered randomly to illuminate as many areas as possible. The randomization removes ambiguities that lead to spatial aliasing and ghosting.

To form an image from the acquired data, we use an iterative reconstruction procedure, which combines compressive sensing and least squares estimation. Results indicate that it is possible to double the coverage area with a minimal resolution penalty. The methodology can easily be incorporated into existing synthetic aperture systems.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating an image, wherein the image is a spotlight synthetic aperture radar (SAR) image, comprising the steps of:
   directing a beam of transmitted pulses at a set of two or more areas using a steerable array of antennas, wherein each area is illuminated by an approximately equal number of the transmitted pulses, and wherein the beam is steered so that the pulses are transmitted to the areas randomly and uniformly in a spatial dimension; and
   applying independently a reconstruction procedure to received signals from each area due to reflecting the transmitted pulses to generate the image corresponding to the set of areas.

2. The method of claim 1, wherein the image is a combination of a sparse component and a residual component, and wherein the reconstruction method further comprises the steps of:
   applying a compressive sensing procedure to generate the sparse component; and
   applying a least square regularization to generate the residual component.

3. The method of claim 2, wherein the compressive sensing procedure further comprises, until a termination condition is reached the iterative steps of:
   producing an approximate image from the received signals;
   applying a threshold to the approximate image to produce a thresholded image;
   generating a simulated signal from the thresholded image;
   scaling the simulated signal to produce a scaled signal; and
   subtracting the scaled signal from the approximate image.

4. The method of claim 3, further comprising:
   subtracting the scaled image from the received signals to produce the residual component.

5. The method of claim 2, further comprising:
producing an approximate image from the received signals;
applying a threshold to the approximate image to produce a thresholded image;
scaling a simulated signal to produce a scaled signal for the sparse component.

\* \* \* \* \*